(12) United States Patent
McGrogan et al.

(10) Patent No.: US 8,126,604 B2
(45) Date of Patent: Feb. 28, 2012

(54) METHOD OF DETERMINING OUTPUT TORQUE CONSTRAINTS FOR A POWERTRAIN

(75) Inventors: Sean W McGrogan, Ann Arbor, MI (US); Anthony H. Heap, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 284 days.

(21) Appl. No.: 12/627,395

(22) Filed: Nov. 30, 2009

(65) Prior Publication Data

US 2011/0130904 A1 Jun. 2, 2011

(51) Int. Cl.
*B60L 3/00* (2006.01)
*G05D 1/00* (2006.01)
(52) U.S. Cl. .............. 701/22; 701/1; 701/54; 701/104
(58) Field of Classification Search .................. None
See application file for complete search history.

(56) References Cited

U.S. PATENT DOCUMENTS 7,467,033 B2 * 12/2008 Miller et al. .................. 701/22
8,002,665 B2 * 8/2011 Heap et al. .................... 477/3
(Continued)

*Primary Examiner* — Khoi Tran
*Assistant Examiner* — Ian Jen
(74) *Attorney, Agent, or Firm* — Quinn Law Group, PLLC

(57) ABSTRACT

A method of determining output torque constraints for a powertrain having a plurality of components includes monitoring individual component limits, including a first motor limit, a first torque transmitting mechanism limit, and a battery power limit. Each of the individual component limits includes a minimum and a maximum individual limit due to each respective component. The method also determines whether each of the individual component limits can be satisfied by selecting a first torque value. The method sets an output torque constraint by selecting the first torque value, if the first torque value satisfies each of the individual component limits. The method selects a second torque value if the first torque value does not satisfy each of the individual component limits, and prioritizes the first motor limit, then the first torque transmitting mechanism limit, and then the battery power limit.

14 Claims, 9 Drawing Sheets

U.S. PATENT DOCUMENTS

| | | | |
|---|---|---|---|
| 2003/0001391 A1* | 1/2003 | Kuang et al. | 290/40 C |
| 2003/0183431 A1* | 10/2003 | Cikanek et al. | 180/65.6 |
| 2003/0184152 A1* | 10/2003 | Cikanek et al. | 303/152 |
| 2003/0184156 A1* | 10/2003 | Hilbert | 303/152 |
| 2004/0044448 A1* | 3/2004 | Ramaswamy et al. | 701/22 |
| 2008/0215201 A1* | 9/2008 | Okubo et al. | 701/22 |
| 2008/0275624 A1* | 11/2008 | Snyder | 701/104 |
| 2009/0115349 A1* | 5/2009 | Heap | 318/8 |
| 2009/0115351 A1* | 5/2009 | Heap et al. | 318/8 |
| 2009/0118077 A1* | 5/2009 | Hsieh et al. | 477/3 |
| 2009/0118081 A1* | 5/2009 | Heap et al. | 477/3 |
| 2009/0118094 A1* | 5/2009 | Hsieh et al. | 477/110 |
| 2009/0118917 A1* | 5/2009 | Sah et al. | 701/54 |
| 2009/0118930 A1* | 5/2009 | Heap et al. | 701/54 |
| 2011/0130904 A1* | 6/2011 | McGrogan et al. | 701/22 |
| 2011/0172860 A1* | 7/2011 | Janczak et al. | 701/22 |

* cited by examiner

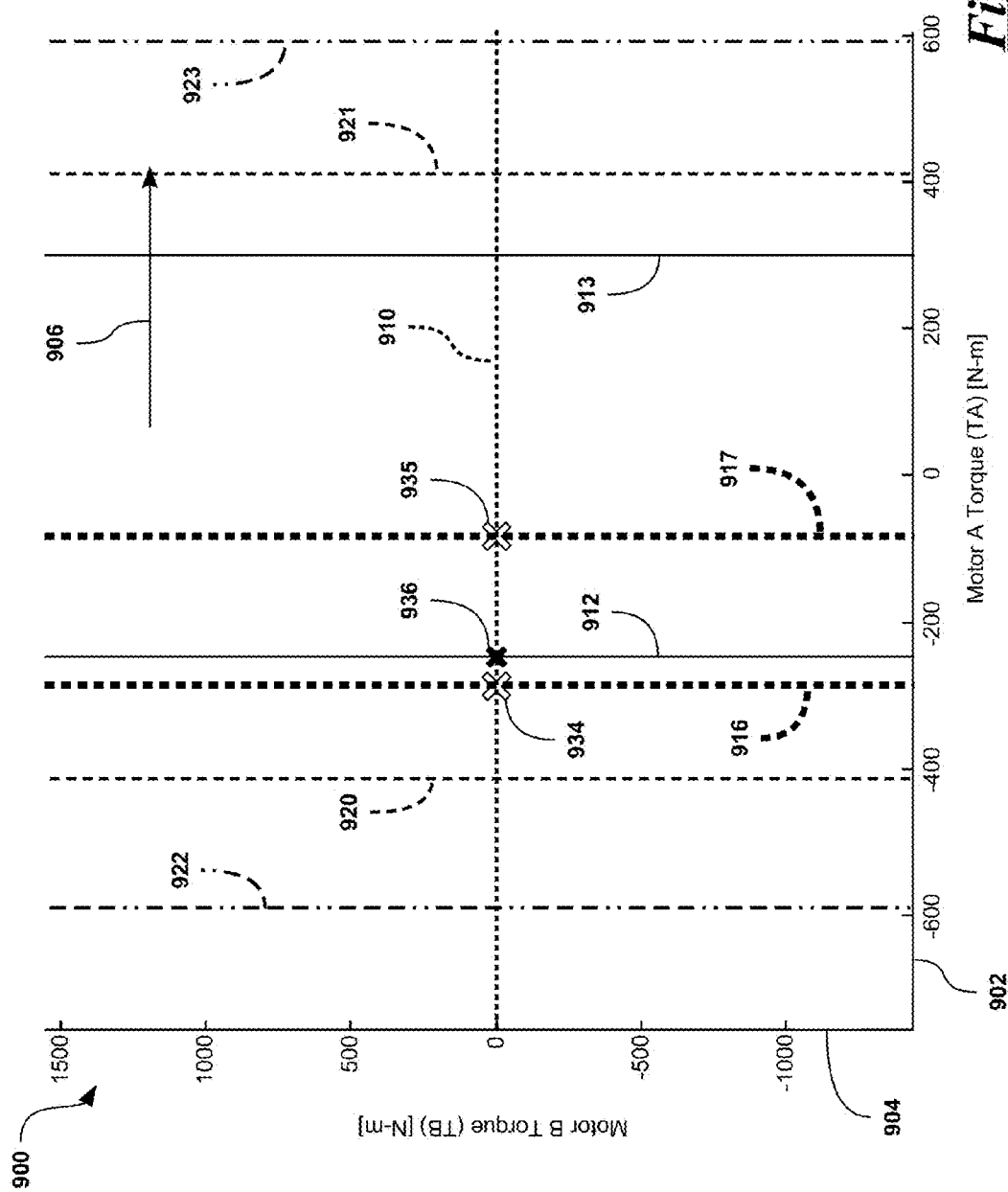

METHOD OF DETERMINING OUTPUT TORQUE CONSTRAINTS FOR A POWERTRAIN

TECHNICAL FIELD

This disclosure relates to determination of output torque constraints for powertrains used in alternative energy vehicles, such as electric vehicles or hybrid vehicles.

BACKGROUND OF THE INVENTION

Motorized vehicles include a powertrain operable to propel the vehicle and power the onboard vehicle electronics. The powertrain, or drivetrain, generally includes an engine that powers the final drive system through a multi-speed power transmission. Many vehicles are powered by a reciprocating-piston type internal combustion engine (ICE).

Hybrid vehicles utilize multiple, alternative power sources to propel the vehicle, minimizing reliance on the engine for power. A hybrid electric vehicle (HEV), for example, incorporates both electric energy and chemical energy, and converts the same into mechanical power to propel the vehicle and power the vehicle systems. The HEV generally employs one or more electric machines (motor/generators) that operate individually or in concert with the internal combustion engine to propel the vehicle.

The electric machines convert kinetic energy into electric energy which may be stored in an energy storage device. The electric energy from the energy storage device may then be converted back into kinetic energy for propulsion of the vehicle. Electric vehicles also include one or more electric machines and energy storage devices used to propel the vehicle.

SUMMARY

A method of determining output torque constraints for a powertrain having a plurality of components is provided. The powertrain includes an engine, a first motor, a battery, and a first torque transmitting mechanism. The method includes monitoring individual component limits, including a first motor limit, a first torque transmitting mechanism limit, and a battery power limit.

Each of the individual component limits includes a minimum and a maximum individual limit due to each respective component. The method also determines whether each of the individual component limits can be satisfied by selecting a first torque value. The method sets an output torque constraint by selecting the first torque value if the first torque value satisfies each of the individual component limits. However, the method selects a second torque value if the first torque value does not satisfy each of the individual component limits.

Selecting the second torque value includes following priorities of: satisfying the first motor limit; then, if possible, satisfying the first torque transmitting mechanism limit; and then, if possible, satisfying the battery power limit. The method also sets the output torque constraint to the second torque value. The method may include arbitrating along a primary line to find a first clear solution. The first clear solution is a solution that satisfies all of the individual component limits.

The above features and advantages and other features and advantages of the present invention are readily apparent from the following detailed description of the best modes and other embodiments for carrying out the invention when taken in connection with the accompanying drawings.

BRIEF DESCRIPTION OF THE DRAWINGS

FIG. 9 is an exemplary graphical representation of individual constraints for a belt alternator starter (BAS) powertrain along with results of the algorithm shown in FIGS. 2-4.

DESCRIPTION OF PREFERRED EMBODIMENTS

Figure 1:
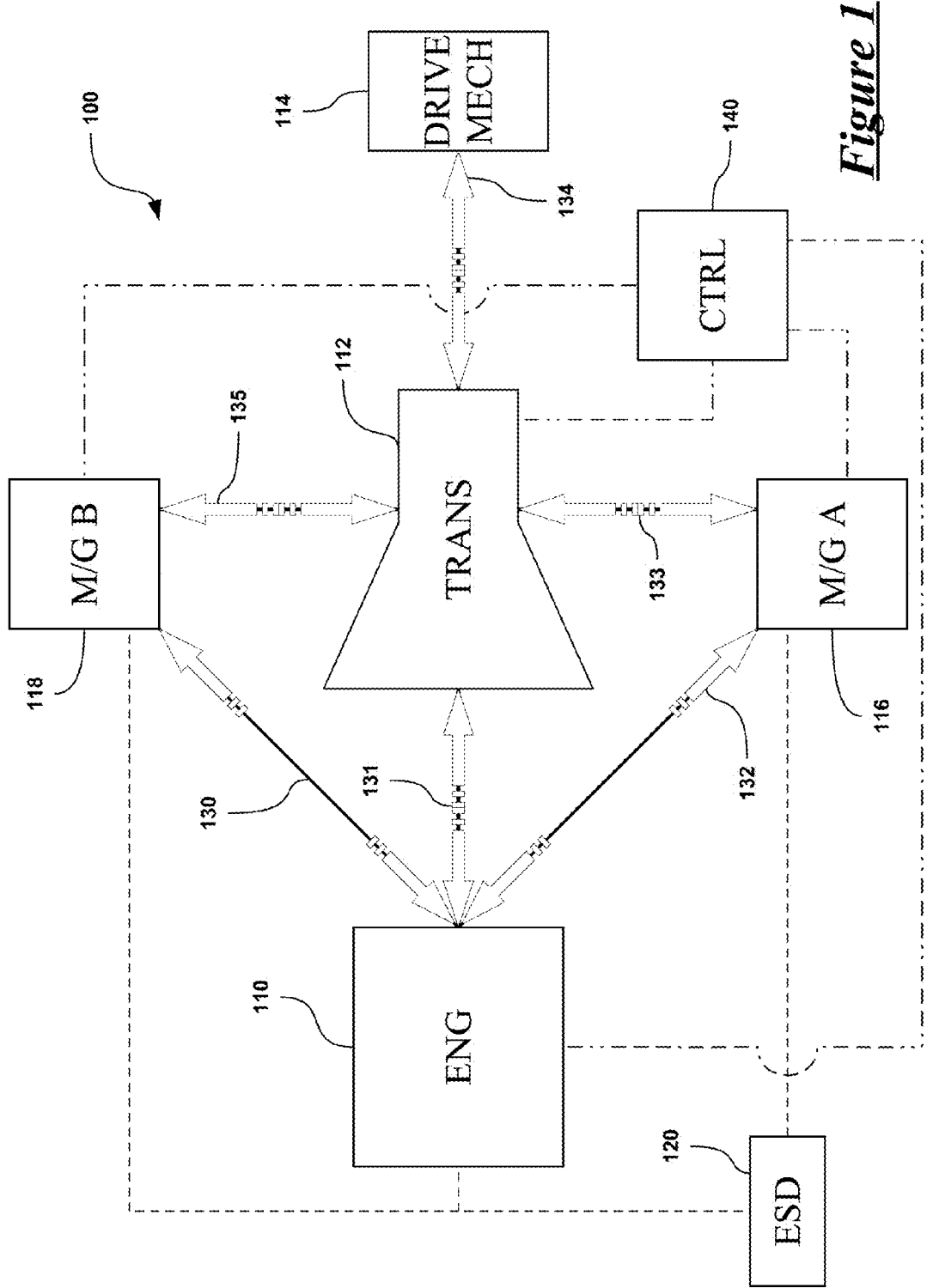
FIG. 1 is a schematic power flow diagram of a hybrid powertrain usable with the claimed invention.

Referring to the drawings, wherein like reference numbers correspond to like or similar components throughout the several figures, there is shown in FIG. 1 a schematic diagram of a hybrid powertrain 100 usable with the claimed invention. As used herein, the term hybrid powertrain refers generally to any powertrain configured for use with multiple power sources (such as an engine and an electric machine), configured for use with purely electric power sources (such as an electric vehicle), or configured for use with other alternative energy traction devices or primary movers. The schematic of powertrain 100 shown in FIG. 1 is highly simplified and may include many additional components or may be shown with extra components not required by the claimed invention.

While the present invention is described in detail with respect to automotive applications, those skilled in the art will recognize the broader applicability of the invention. Those having ordinary skill in the art will recognize that terms such as "above," "below," "upward," "downward," et cetera, are used descriptively of the figures, and do not represent limitations on the scope of the invention, as defined by the appended claims.

The powertrain 100 includes an internal combustion engine 110 and a transmission 112. The powertrain 100 transfers output torque to propel the hybrid vehicle into which the powertrain 100 is incorporated at a drive mechanism 114. The drive mechanism 114 may be the final drive linking the powertrain 100 to the axle, a direct connection to the driven wheels of the vehicle, a transfer case for four-wheel-drive or all-wheel-drive vehicles, or another mechanism communicating torque from the powertrain 100 to propel and provide traction for the vehicle, as would be recognized by one having ordinary skill in the art. In addition to the engine 110, the powertrain 100 shown includes two further prime movers, both of which are electric machines, a first motor/generator 116 and a second motor/generator 118. The first and second motor/generator 116 and 118 may also be referred to as motor/generator A and motor/generator B, respectively.

Torque is transferred between the components of the powertrain via torque transmitting mechanisms (TTM) 130, 131, 132, 133, 134, and 135. The torque transmitting mechanisms 130-135 may be belts or shafts, such that the components are not selectively connected or disconnected from each other. However, the torque transmitting mechanisms 130-135 may also be hydraulically-actuated, selective torque transmitting mechanisms, such as clutches, brakes, dog clutches, et cetera.

The torque transmitting mechanisms 130-135 allow transfer between the linked components. Some torque transmitting mechanisms 130-135 allow both positive and negative torque transfer, and some allow only a single direction of torque transfer. For example, the torque transmitting mechanism 130 allows the engine 110 to transfer torque to the motor/generator 118 and also allows the motor/generator 118 to transfer torque to the engine 110.

The powertrain 100 shown is illustrative only, and the connections shown are only intended as power flow diagrams. The motor/generators 116, 118 may be located within the transmission 112, and the transmission 112 configured as a multi-mode transmission, having the ability to act as an electrically-variable transmission (EVT) or in fixed-gear modes, such that the transmission may operate in parallel, series, and power-split hybrid modes, electric-only modes, and conventional (non-hybrid) transmission modes.

The powertrain 100 may include only one motor/generator 116 in direct communication with only the engine 110, and not in direct communication with the transmission 112. One motor/generator 116 may be located between the engine 110 and transmission 112 and may be directly coupled to the engine 110 through a shaft or sleeve shaft.

Furthermore, the powertrain 100 may be configured for use in pure electric vehicles, such that there is no internal combustion engine included. The motor/generators 116, 118 may be connected directly to the drive mechanism 114.

An energy storage device (ESD), such as a battery 120 (labeled ESD in FIG. 1), accepts energy generated by the motor/generators 116, 118, and supplies energy to the motor/generators 116, 118 to be converted into mechanical energy. The powertrain 100 may include a plurality of energy storage devices. The battery 120 may be a chemical storage battery, or another energy storage device recognizable to those having ordinary skill in the art. Each individual energy storage device or battery 120 may be either a single unit (which likely include multiple cells) or a battery pack. The battery 120 may further be utilized to supply ignition spark to the engine 110 and may be connected to a starter motor to assist in cranking the engine 110—which may also be accomplished with one of the motor/generators 116, 118.

Individual components within the powertrain 100 have operating constraints or limits beyond which, especially for extended (longer than transient) time periods, the component may be prone to damage, failure, or excess wear. Each of the individual component limits includes a minimum and a maximum individual limit due to the respective component, such that—as long as the maximum and minimum are not equal—the individual component limits are ranges. As used herein, in order to "satisfy" limits for any specific individual component, the output torque constraint must be chosen such that the torque of motor/generators 116, 118 occurs at a point within the range of limits for that individual component (less than the maximum and greater than the minimum).

As operating conditions of the vehicle and the powertrain 100 change, so do the individual component limits. In order to protect the components, a controller 140—or a plurality of controllers 140—monitors the operating conditions of the powertrain 100 and individual components and determines the resulting output torque constraints for the powertrain 100 that are best able to protect all individual components, as described herein.

Controller 140 includes a computer processing device capable of calculating output torque from an algorithm (such as the invention described herein) and either directly controlling or commanding control of the motor/generators 116, 118. Controller 140 may be part of a hybrid torque determination module, a stand-alone controller, incorporated into the hybrid control processor (HCP), a part of the vehicle computer or ECU, or another suitable controller recognizable to those having ordinary skill in the art.

Where one or more of the torque transmitting mechanisms 130-135 is a shaft or a belt, the individual component limits for that TTM are physical limits based upon size and material of the shaft or size and friction characteristics of the belt (and pulleys). However, where one or more of the torque transmitting mechanisms 130-135 is a hydraulic clutch or brake, the individual component constraints for that TTM are not only physical limits based upon the friction materials of the clutch, but also limits based upon the hydraulic pressure engaging the clutch plates.

Generally, individual limits for clutch torque transmitting mechanisms 130-135 are calculated only when the clutch is engaged or partially engaged (slipping), as opposed to completely disengaged (open, and not carrying or transferring torque). This is referred to as a "locked" clutch herein. A completely open, unlocked, non-torque-carrying clutch may be modeled as having infinitely large limits (which would not ever limit operation of the powertrain 100). In order to protect the locked clutches, individual limits or constraints may be calculated as minimum and maximum amounts of torque which may be transferred across individual locked clutches. Satisfying these individual limits will result in protection of the locked clutches.

In addition to limits for the torque transmitting mechanisms 130-135, further hardware limits or component constraints may be implemented in order to protect motor/generators 116, 118 and assist the controller 140 in determining the operating limits for the first motor/generator 116 and (if included in the powertrain 100) second motor/generator 118. The individual limits for the motor/generators 116, 118 are calculated based upon state information and hardware characteristics including, and without limitation: motor temperature, motor speed (often denoted by $N_A$ and $N_B$), voltage supplied to the motor/generators 116, 118, motor type (permanent magnet, induction, et cetera), and other factors recognizable to those having ordinary skill in the art.

The battery 120 may also have individual component limits that may affect the overall output torque constraints for the powertrain 100. The individual component limits for the battery 120 may also be referred to as hardware limits. Individual component limits for the battery 120 may be determined by characteristics of the battery 120 and state information including, but not limited to: battery temperature, state of charge of the battery 120, life target (in years or duty cycles) of the battery 120, particular cell chemistry of the battery pack, the number of cells within the battery pack, and other state information recognizable to those having ordinary skill in the art. For illustrative purposes, the individual component limit for the energy storage device is referred to herein as a battery power limit. However, the powertrain 100 may include any energy storage device for which the primary individual limits may be expressed as a function of the individual torques of motor/generators 116, 118.

Determination of the hardware limits or individual component constraints may occur within the controller 140 or may be determined elsewhere in control architecture for the vehicle or powertrain 100. If the individual component constraints are determined elsewhere, the controller 140 may treat them as inputs or given values within equations. The controller 140 monitors the individual component limits and factors those limits into a determination of the overall maximum and minimum output torque constraints for the powertrain 100, as described herein.

Each of the individual component limits (for battery 120, motor/generators 116, 118, and torque transmitting mechanisms 130-135) may be expressed as a function of the torque of motor/generator 116 (referred to for simplicity as TA, because motor/generator 116 is also referred to as motor A) and the torque of motor/generator 118 (referred to for simplicity as TB, because motor/generator 118 is also referred to as motor B). The overall output torque (referred to for simplicity as TO) may similarly be expressed as a function of TA and TB, such that TA and TB may be controlled to implement the output torque constraints determined by the controller 140.

Figure 5:
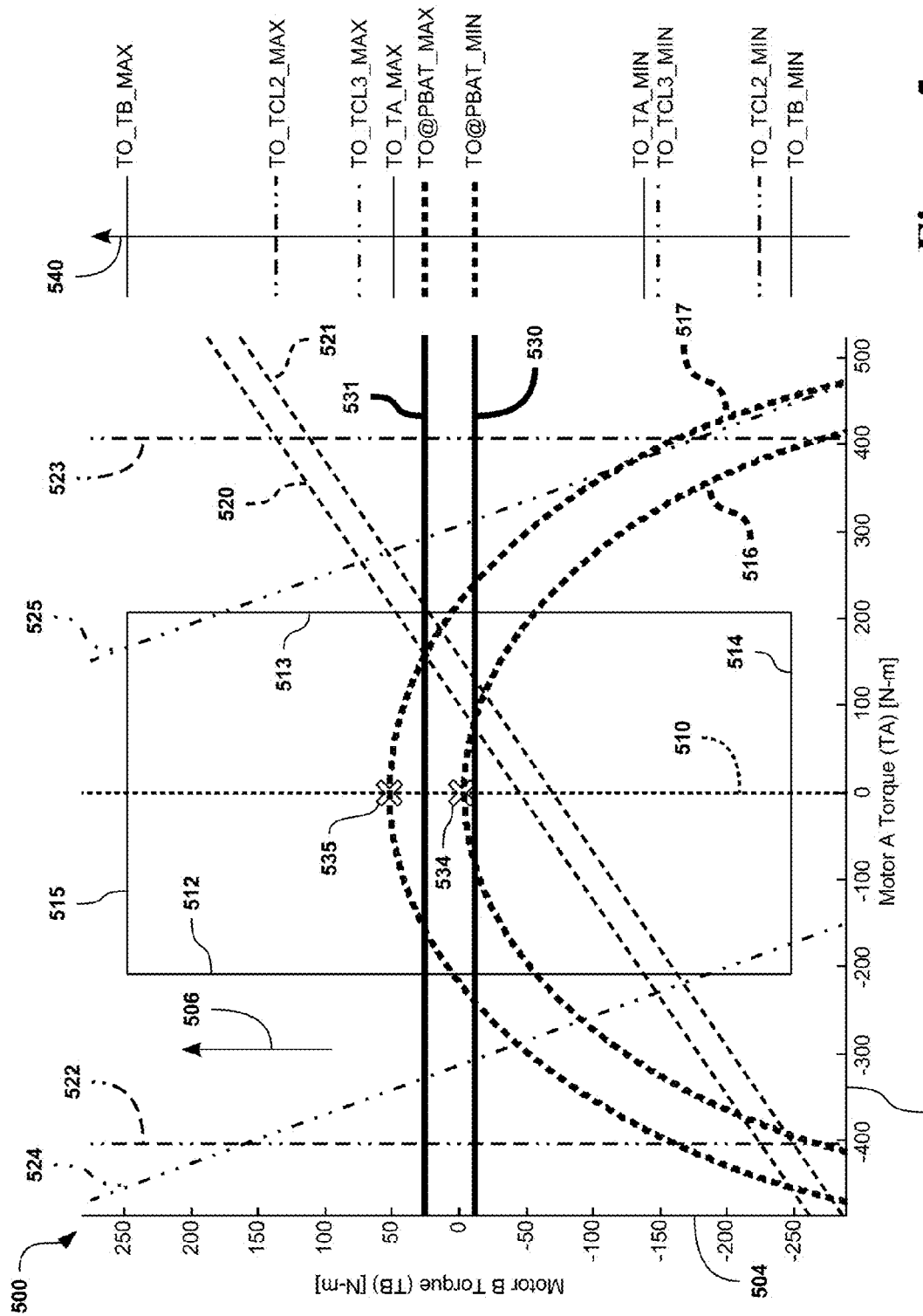
FIG. 5 is an exemplary graphical representation of individual constraints for a powertrain along with results of the algorithm shown in FIGS. 2-4, showing protection and satisfaction of all motor, clutch, and battery limits, but operating at less than optimal output.
Figure 6:
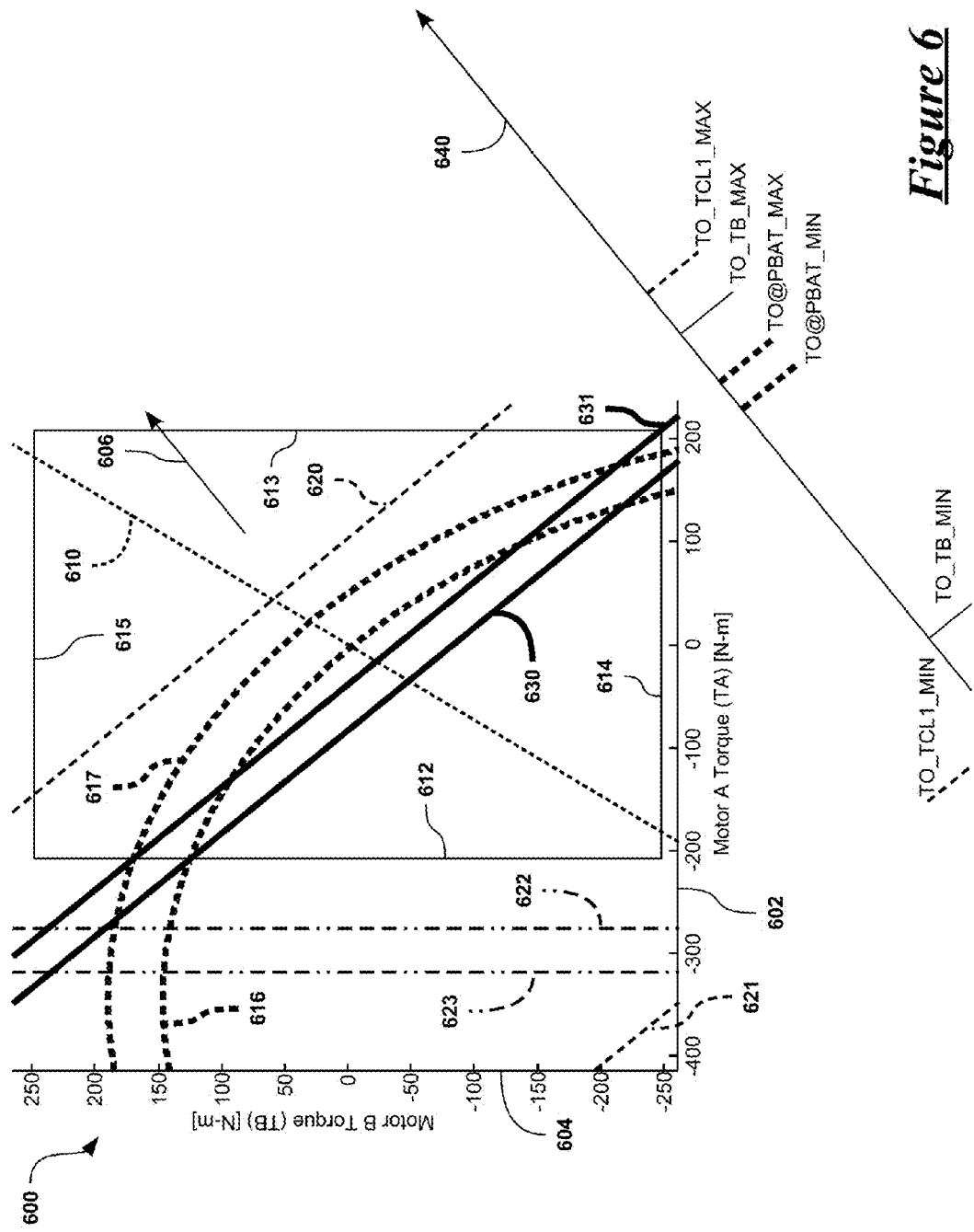
FIG. 6 is another exemplary graphical representation of individual constraints for a powertrain along with results of the algorithm shown in FIGS. 2-4, showing protection and satisfaction of all motor limits and violation of one clutch limit.
Figure 7:
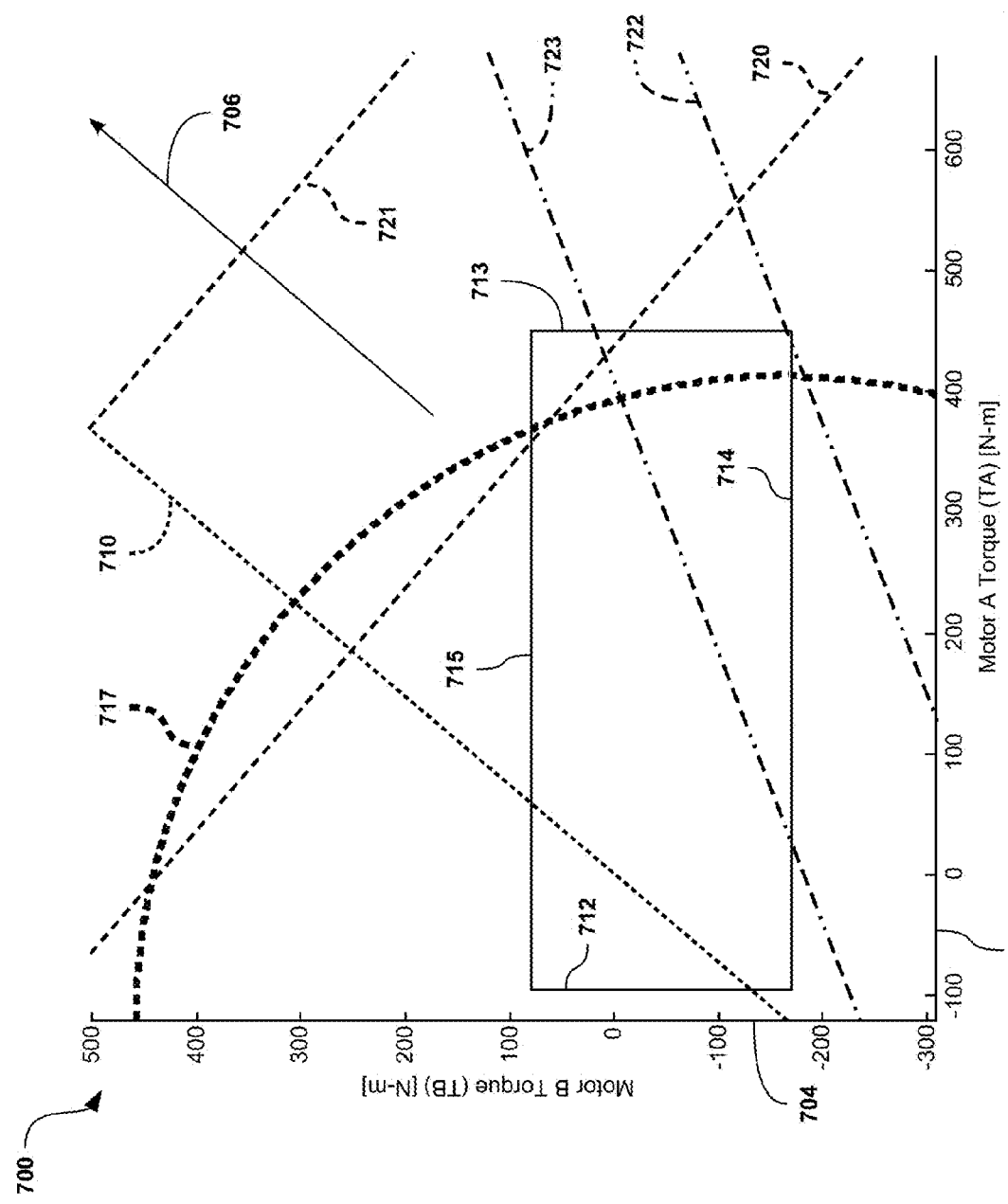
FIG. 7 is yet another exemplary graphical representation of individual constraints for a powertrain along with results of the algorithm shown in FIGS. 2-4, showing protection and satisfaction of all motor limits and clutch limits, but violating the battery power limit.

As shown in relation to FIGS. 5-7, and discussed in more detail herein, the individual component limits and resulting output torque constraints may be plotted graphically in relation to TA and TB. When graphed on a TA-TB plot, the hardware limits (motor/generators 116, 118 and torque transmitting mechanisms 130-135) result in straight lines and the limits for battery 120 result in ellipses (although some applications of the claimed invention may consider the limits for the battery 120 hardware limits). Output torque TO is also a straight line.

Figure 2:
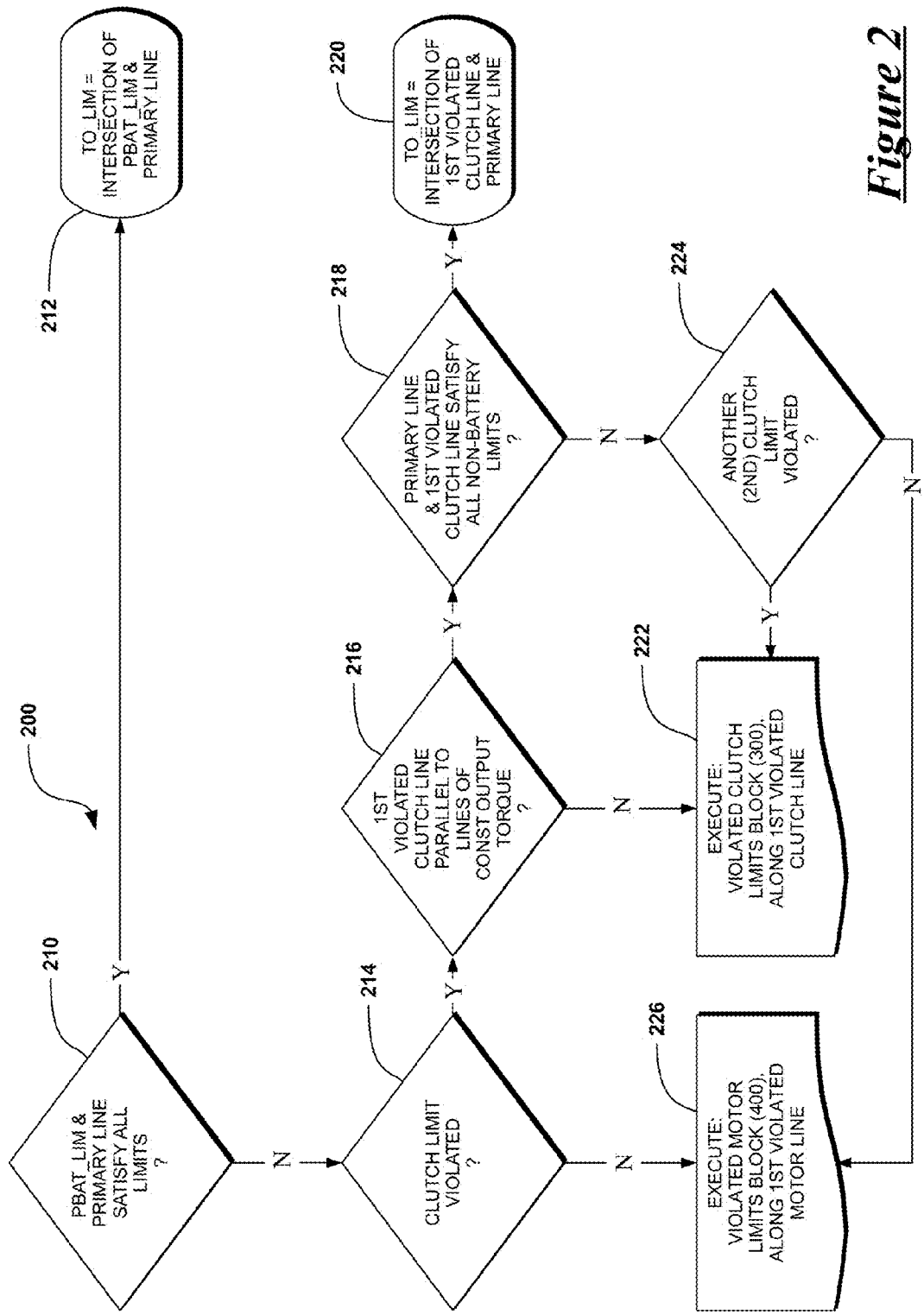
FIG. 2 is a schematic flow chart of the top level of a method or algorithm for determining output torque constraints in hybrid powertrains.
Figure 3:
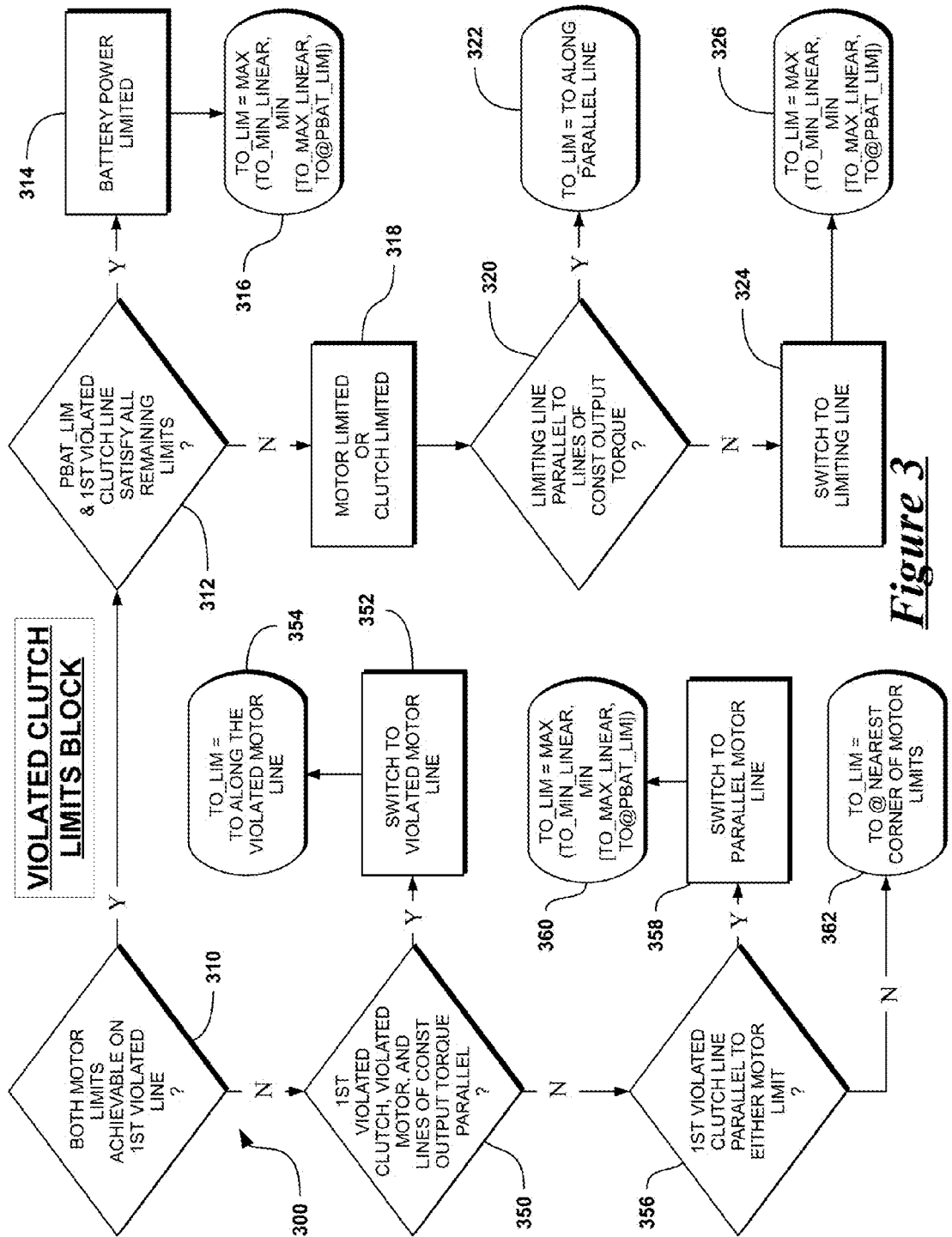
FIG. 3 is a schematic flow chart of a sub-routine of the algorithm shown in FIG. 2.
Figure 4:
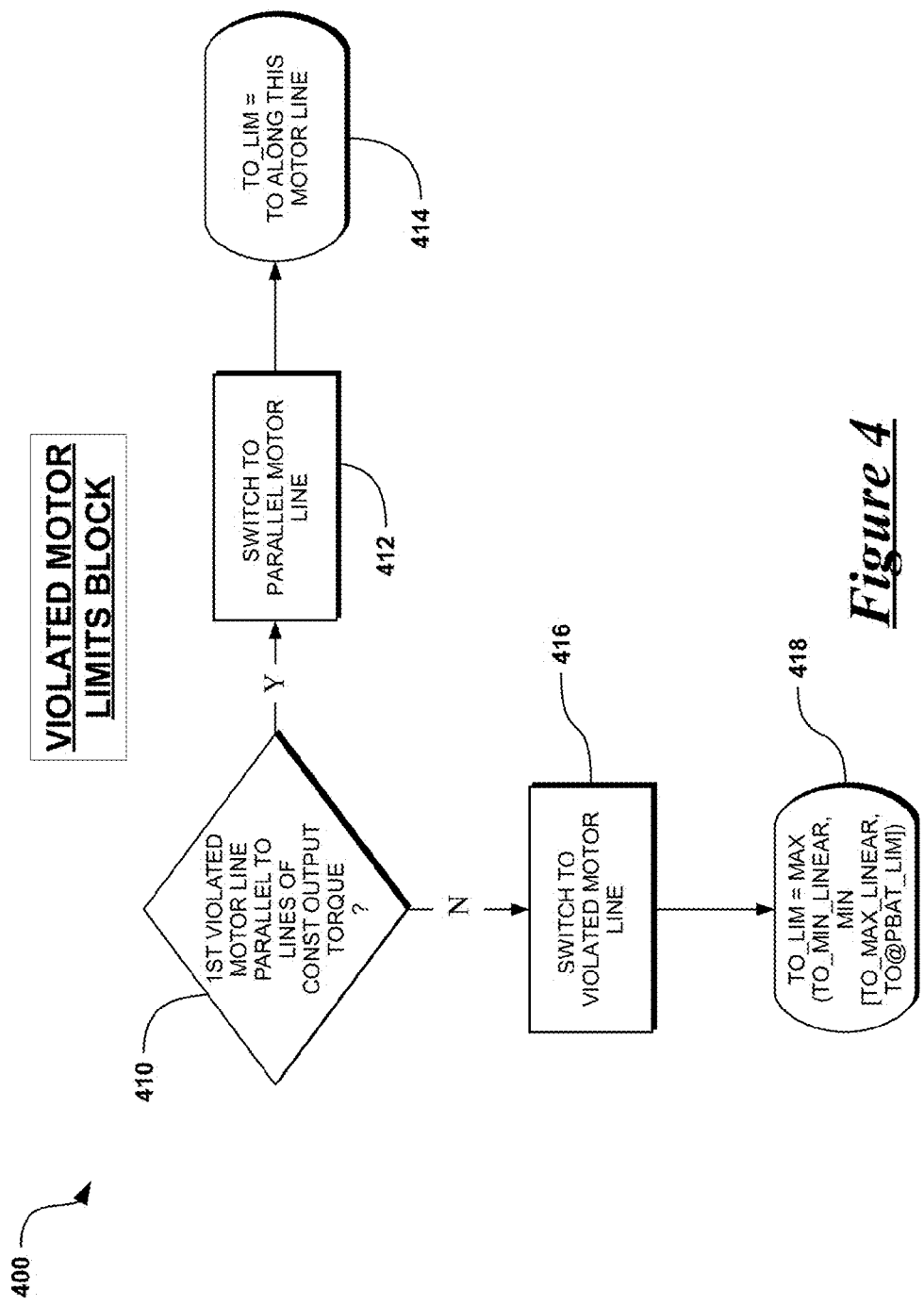
FIG. 4 is a schematic flow chart of another sub-routine of the algorithm shown in FIG. 2.

Referring now to FIG. 2, FIG. 3, and FIG. 4—and with continued reference to FIG. 1—there is shown a method or an algorithm 200 for determining an output torque constraint TO from individual component limits. The top-level of algorithm 200 is shown in FIG. 2. FIGS. 3 and 4 show sub-routines 300 and 400, respectively, of the algorithm 200.

Algorithm 200 may be executed by the controller 140 or another controller capable of processing the individual component limits and outputting the output torque constraint TO—or constraints TO_MAX and TO_MIN if used to determine upper and lower constraints—in a manner usable to constrain torque output of the powertrain 100, if necessary. The algorithm 200 may operate in a looping fashion, as a periodic call-up function from a controller, or may run in a steady-state fashion (constantly calculating and monitoring).

The exact order of the steps of the algorithm 200 shown may not be required; steps may be reordered, steps may be omitted, and additional steps may be included, as would be recognized by those having ordinary skill in the art. Initiation of algorithm 200 may occur automatically as the vehicle is turned on or activated for use, or may occur based upon individual call-ups from the controller 140.

At step 210 the algorithm 200 finds the intersection of a primary line and a battery limit, and determines whether that intersection satisfies all individual component limits. The primary line is the first reference line along which the algorithm 200 searches for an output torque TO that will satisfy all individual component limits. For example, the primary line may be an optimal split ratio for motor torques TA and TB, such that, for any given output torque TO, operation along the optimal split line more efficiently utilizes energy from the battery than operation off of the optimal split line.

Under some conditions, deviation from the optimal split ratio may be thought of intuitively as commanding the motor/generators 116, 118 to fight against each other. The optimal split line depends on the losses of the two motor/generators 116, 118 relative to each other, and on the speeds ($N_A$ and $N_B$) of the motor/generators 116, 118, which are directly proportional to output speed ($N_O$). The optimal split ratio generally occurs only while the powertrain 100 is operating in fixed-gear states.

When the algorithm 200 is checking for a value along a line, intersection with a line, or violation of a line, the algorithm is referring to the mathematical expression of one of the individual component limits as a function of the motor torques TA and TB. Graphically and visually, these functions are lines on graphs or plots of the individual component limits with respect to the motor torques TA and TB (see FIGS. 5-9 for illustrative graphical examples). Intersection with any specific reference line generally refers to a point along that line, which may be found by mathematically solving for the point along the reference line or visually finding an intersection of the reference line. Violation of any specific reference line means that no solution may be found by mathematically solving for the point along the reference line or that no visual intersection can be found.

The algorithm 200 is configured to find either maximum output torque (TO_MAX) or minimum output torque (TO_MIN). As shown in FIGS. 2-4, when the algorithm 200 labels an item with "_LIM," the item may be either "_MAX" or "_MIN," depending on the goal of the algorithm 200. Therefore, in step 210, PBAT_LIM is maximum battery power (PBAT_MAX) when the algorithm is solving for maximum output torque (TO_MAX) and minimum battery power (PBAT_MIN) when the algorithm is solving for minimum output torque (TO_MIN).

Note that, while the vehicle is moving backwards (reversing), such that output speed ($N_O$) is negative, the algorithm may switch the battery power limits used to determine the output torque constraints. Therefore, while the vehicle is moving backwards, the battery power limit used to determine TO_MAX is PBAT_MIN, and PBAT_MAX is used to determine TO_MIN.

If step 210 determines that the intersection of the primary line and PBAT_LIM does satisfy all individual component limits, the algorithm 200 has already found the best available solution and no further calculation may be necessary. Therefore, the algorithm proceeds directly to step 212, and output torque constraint (either TO_MIN or TO_MAX) for powertrain 100 is set to the value of output torque at the intersection.

Step 212 is the most optimal solution, and the powertrain 100 may be configured such that the algorithm 212 arrives at step 212 during most operating conditions. However, there may be conditions during which the most optimal solution is not available, especially during transient events, such as shifts between electrically-variable transmission modes or while one of the individual components performs in an unexpected manner.

If the algorithm 200 is solving or searching for maximum output torque, step 212 sets TO_MAX to the output torque value at the intersection of PBAT_MAX and the primary line, and if the algorithm is solving for minimum output torque, step 212 sets TO_MIN to the output torque value at the intersection of PBAT_MIN and the primary line. Setting TO_LIM at step 212 acts as a shortcut and reduces the total amount of throughput required of the algorithm 200 by ending calculations as soon as a solution is found. Reduced throughput for the controller 140 may yield (without limitation) faster processing times, lower power usage by the controller 140, or the ability to re-run the algorithm 200 sooner.

As used herein, "setting" output torque constraints refers to providing an output torque constraint value for operation of the powertrain 100. Depending upon the configuration of the powertrain 100, and the operating conditions of the vehicle, the output torque constraint (either minimum or maximum) may be directly utilized as provided by the algorithm 200. However, the output torque constraint may be subject to further modification or filtering. Note, also, that the output torque constraint may not always be limiting the output torque requested of the powertrain 100, because the output torque requested may often already lie within the output torque constraints determined by the algorithm 200.

If the intersection of PBAT_LIM and the primary line does not satisfy all individual component limits, the algorithm proceeds to step 214. Step 214 determines whether a clutch limit is violated by the intersection of PBAT_LIM and the primary line. While the schematic flow chart of FIG. 2 refers to "clutch" limits in step 214, the algorithm 200 may be configured to check for violation of any torque transmitting mechanism 130-135 (including belts, shafts, et cetera).

If the algorithm 200 is unable to find an output torque (TO_MAX or TO_MIN) that satisfies all individual component limits—such that a clear solution cannot be found—the algorithm 200 will satisfy some of the component limits by following a priority or hierarchy. The highest priority for the algorithm 200 is satisfaction of the limits of motor/generators 116 and 118. The next highest priority is satisfaction of the limits of the torque transmitting mechanism 130-135. The lowest priority is satisfaction of the battery power limits for the battery 120. Therefore, the hardware limits of the motor/generators 116, 118 and torque transmitting mechanism 130-135 take priority over the power limits of battery 120.

If step 214 determines that there is a first violated clutch line, the algorithm 200 proceeds to step 216 using the first violated clutch line. If more than one clutch is violated, the first violated clutch line may be differentiated from the other (second or third) violated clutch lines by one of several methods. For example, and without limitation, the first violated clutch line may be chosen from the most extremely-violated clutch line along the primary line—i.e. if the algorithm is solving for TO_MAX, the first violated clutch line is the violated clutch with the highest output torque along the primary line. In such a configuration, the first violated clutch line also has the intersection point furthest in the direction of increasing output torque when the individual component limits are plotted with respect to TA and TB.

Alternatively, the first violated clutch line may also be the closest violated clutch to the intersection point (the line having the nearest point). Furthermore, the first violated clutch line may be chosen by simply assigning a number to all clutches and choosing the lowest or highest numbered clutch first.

The first violated clutch line acts as a secondary line, and the algorithm 200 may utilize the secondary line to find a clear solution if arbitration along the primary line does provide a clear solution. As used herein, "arbitrating" along a reference line (such as the primary line or the secondary line) includes solving for an output torque (TO_MAX or TO_MIN) along the reference line that satisfies all individual component limits. The solution may actually be a range of points (i.e. a line segment) that satisfies all individual component limits, such that, for example, TO_MAX may be set anywhere along the range while satisfying all individual component limits. If no such point or range exists—such that no clear solution along the reference line exists—and a final solution must be found along the reference line, then arbitration will further include excluding the lowest priority unsatisfied individual component limit and finding the nearest solution to the lowest priority unsatisfied individual component limit that still satisfies all remaining individual component limits.

Primary and secondary lines are lines along which the algorithm 200 and sub-routines 300, 400 will attempt to find a clear solution. However, if arbitration along the primary and secondary lines cannot provide a solution, the algorithm may move to another line, a tertiary line. The algorithm 200 is configured to always find a solution once it has moved to a tertiary line, such that no further lines are arbitrated after the tertiary line. Arbitration along primary, secondary, and tertiary reference lines will be further explained in relation to the sub-routines 300 and 400, and is shown graphically in FIGS. 5 and 6.

Step 216 determines whether the first violated clutch line is parallel to lines of constant output torque TO. If any line is parallel to lines of constant output torque, then arbitration along that line would result in only a single point (all points along the parallel line have the same TO value). If the first violated clutch line is parallel to lines of constant output torque, the algorithm 200 proceeds to step 218 to determine whether the intersection of the primary line and the first violated clutch line satisfies all non-battery limits (that is, whether the intersection satisfies all hardware limits).

If step 218 determines that the intersection of the primary line and the first violated clutch line satisfies all non-battery limits, the algorithm 200 proceeds to step 220 and sets the output torque at the intersection. Step 220 acts as another shortcut operation by setting the TO_LIM without arbitrating along one or more additional reference lines if the intersection of the primary line and the first violated clutch line satisfies all but the lowest-priority limit (the power limit for battery 120, PBAT_LIM).

If step 216 had determined that the first violated clutch line was not parallel to lines of constant output torque, then arbitration along the first violated clutch line (the secondary line) may yield a clear solution. The algorithm then proceeds to step 222 and executes a violated clutch limits block, sub-routine 300, along the first violated clutch line.

If step 218 had determined that the intersection of the primary line and the first violated clutch line does not satisfy all non-battery limits, then either another clutch limit or a motor limit is violated and the algorithm 200 proceeds to step 224 to determine which other individual component limits are unsatisfied. If another (a second) clutch limit is violated, the algorithm again moves to step 222 and executes sub-routine 300. Note that the algorithm 200 always executes the sub-routine 300 by starting along the first violated clutch line (the secondary line).

If another clutch limit was not violated, the algorithm moves from step 224 to step 226. Step 226 executes a violated motor limits block, sub-routine 400, along a first violated motor line.

The sub-routine 300 begins at step 310 by determining whether both of the limits for the motor/generator 116 and the motor/generator 118 are simultaneously achievable along the first violated clutch line. If both motor limits are achievable on the first violated clutch line, the sub-routine 300 proceeds to step 312 to determine whether the output torque constraint is being limited by non-battery limits along the reference line. If step 312 determines that the intersection of PBAT_LIM and the first violated clutch line satisfies all remaining limits, the sub-routine 300 is limited by battery power and proceeds to step 314.

At step 316, the sub-routine arbitrates along the first violated clutch line to find a clear solution. Because the intersection of PBAT_LIM and the first violated clutch line satisfies all remaining limits, the algorithm knows that a clear solution is available and will simply find the best solution. Step 316 executes the following logic to arbitrate for output torque along the first violated clutch line: TO_LIM=maximum (TO_MIN_LINEAR, minimum [TO_MAX_LINEAR, TO@PBAT_LIM]).

All of the linear values for arbitration are the output torque values of an individual component limit at its intersections with the reference line, such that each intersecting component provides a maximum output torque due to that component and a minimum output torque due to that component. Linear values are taken only from the hardware limits (for motor/generators 116, 118 and torque transmitting mechanisms 130-135), and do not include intersections of battery power with the reference line.

In step 316, the reference line is the first violated clutch line, which is a secondary line. TO_MIN_LINEAR is the maximum of all the individual minimum output torque limits arising from the individual component limits intersecting the secondary line (that is, the least extreme of all the individual minimum component output torque limits). TO_MIN_LINEAR along a given reference line is the minimum output torque that satisfies both the motor constraints and the clutch constraints along that reference line. See FIGS. 5, 6 and 8 for examples of linear arbitration along a reference line.

Similarly, TO_MAX_LINEAR is the minimum of all of the individual maximum component limits (that is, the least extreme of all the individual maximum output torque limits along the reference line). Note that wide individual component limits (those with a relatively large difference between the maximum and minimum) are more flexible limits than narrow individual component limits (those with relatively close maximum and minimum limits).

Step 316 arbitrates along the secondary line, the first violated clutch line, to find a TO_LIM which satisfies all of the individual component limits, and sets TO_LIM to that value. However, unlike step 212, step 316 does not find the optimal solution. Step 316 finds a non-optimal solution that still satisfies all of the individual component limits without any lower-priority exclusions, and is therefore a clear solution. For an illustrative example of operating conditions for which the algorithm 200 and sub-routine 300 end at step 316, along with a visual example of arbitration along the first violated clutch line, see FIG. 5 and the description of graph 500 herein.

If step 312 had determined that the intersection of PBAT_LIM and the first violated clutch line does not satisfy all remaining limits, step 318 recognizes that the sub-routine 300 is limited by either a motor limit or another clutch limit. Step 318 will recognize the highest priority limiting component as the limiting line, and establish that line as a tertiary line. Therefore, step 318 will recognize a limiting motor/generator 116, 118 before recognizing another limiting clutch line. This is because the sub-routine 300 will not move to a clutch as a tertiary line if that would cause violation of the higher-priority motor/generator 116 or 118 limit.

The sub-routine 300 then proceeds with the identified limiting (tertiary) line to step 320, which determines whether the limiting line is parallel to lines of constant output torque. If the limiting line is parallel to output torque, the sub-routine proceeds to step 322. Arbitration along the limiting line would always result in a single output because there is only one value of output torque along the limiting line. At step 322, the sub-routine sets the output torque for the powertrain 100 to the output torque along the limiting line. For an illustrative example of operating conditions for which the algorithm 200 and sub-routine 300 end at step 322, see FIG. 7 and the description of graph 700 herein.

If the limiting line is not parallel to lines of constant output torque, the sub-routine proceeds from step 320 to step 324 and switches to the limiting line for arbitration. At step 326, the sub-routine arbitrates along the limiting line to find the best available solution. Arbitration along the limiting line may result in a solution which does not satisfy the battery power limit, all of the clutch limits, or a combination thereof.

Returning to the beginning of the sub-routine 300, if step 310 determines that there is no segment of the first violated clutch line which simultaneously achieves both motors' limits, the sub-routine 300 proceeds to step 350. The inability of the first violated clutch line to simultaneously satisfy the limits of both motor/generator 116 and motor/generator 118 means that the first violated clutch line cannot be satisfied while also satisfying the motors, which are the highest priority individual component limits.

At step 350, after leaving the secondary line (first violated clutch line), the sub-routine begins to solve for a final solution by finding a tertiary line that can be used to find a solution satisfying both motor limits and coming as close as possible to meeting the excluded first violated clutch line. Step 350 determines whether the first violated clutch line, the first violated motor line, and constant lines of output torque are all parallel.

The limits for the motor/generators 116 and 118 are perpendicular lines on a plot of motor A and motor B torques. Therefore, if the first violated clutch limit is parallel to one of the motor limits (for example motor A), the first violated clutch will never intersect the limit lines for that motor and will intersect the limit lines for the other motor (which would be motor B) twice. If step 350 is answered affirmatively, there is only one violated motor line relative to the first violated clutch line (motor A, in the example above), and the sub-routine switches to that line at step 352. The violated motor line becomes the tertiary line.

The violated motor line also represents a clutch torque as near as possible to the first violated clutch line, which has been excluded and will not be satisfied in the final solution. No further arbitration is needed along the violated motor line, because that line is parallel to output torque (as determined by step 350) and all points along the violated motor line have equal values of TO and are equally distant from satisfying the first violated clutch line. Step 354 sets the output torque constraint for the powertrain 100 to TO along the violated motor line.

At step 356, the sub-routine 300 determines whether the first violated clutch line is parallel to either motor limit—though neither is parallel to constant lines of output torque, as determined in step 350. If the first violated clutch line is parallel to one of the motor limits, step 358 switches to that limit. Note that both the maximum and minimum motor limit lines are parallel to the first violated clutch line, so step 358 switches to the parallel motor limit which is violated by the first violated clutch line (this is also the nearest motor limit line).

At step 360, the sub-routine 300 arbitrates along the parallel motor line to find the best remaining solution. Note that any point along the parallel motor line is equally close to the first violated clutch line, so arbitration along the parallel motor line completely ignores the first violated clutch line. Arbitration in step 360 again uses the formula:

TO_LIM=maximum (TO_MIN_LINEAR, minimum [TO_MAX_LINEAR, TO@PBAT_LIM]). This arbitration may or may not also result in violation of the battery limit (PBAT_LIM), because that individual component limit has lower-priority than the motor limits. However, the arbitration will attempt to satisfy the battery power limits, if possible.

The arbitration will attempt to satisfy any other clutch limits which intersect the parallel motor line. For an illustrative example of operating conditions for which the algorithm 200 and sub-routine 300 end at step 360, along with a visual depiction of arbitration along the tertiary line (the parallel motor line), see FIG. 6 and the description of graph 600 herein.

If step 356 determines that the first violated clutch line is not parallel to either motor limit, then the sub-routine 300 proceeds to 362. The nearest corner of the limits for motor/generators 116 and 118 is also the point that satisfies both motor limits and is least-violative of the first violated clutch line.

Step 362 could alternatively be expressed as linear arbitration along either of the violated motor limit lines, because linear arbitration along these lines would, in almost all cases, result in selection of the intersection of the motor limit lines nearest the first violated clutch line.

Sub-routine 400, as shown in FIG. 4, may be accessed and commanded via step 226 of algorithm 200, as shown in FIG. 2. Algorithm 200 moves to sub-routine 400 when it reaches a point at which the clutch limits are satisfied, but one or both of the motor limits is not satisfied. Because the limits for motor/generators 116 and 118 receive the highest priority, the algorithm 200 immediately proceeds to sub-routine 400 to satisfy the motor limits. The motor limit lines may be treated as tertiary (or final) lines, along which a solution—whether a clear solution or a solution excluding lower-priority individual component limits—is always found.

Sub-routine 400 is executed along the first violated motor line. If the limits of more than one motor/generator 116, 118 are violated (at, for example, the intersection of the primary line and PBAT_LIM), the sub-routine 400 may determine the first violated motor line by selecting the most-extreme of the violated motor lines. The most-extreme motor line intersects the reference line at the highest value of output torque TO if the algorithm 200 is solving for TO_MAX and at the lowest value of TO if the algorithm 200 is solving for TO_MIN. Alternatively, the sub-routine 400 may be configured to always select motor/generator 116 (motor A), or be configured to select the nearest limit to the reference line or intersection point.

At step 410, the sub-routine 400 determines whether the first violated motor line is parallel to lines of constant output torque. If the first violated motor line is parallel to lines of constant output torque, the sub-routine switches its reference line to the first violated motor line at step 412. At step 414, the output torque for the powertrain 100 is set to the value of TO along the first violated motor line.

If step 410 determines that the first violated motor line is not parallel to lines of constant output torque, the sub-routine proceeds instead to step 416. The non-parallel first violated motor line becomes the reference line. Arbitration along the first violated motor line occurs at step 418. The sub-routine 400 searches for a clear solution along the first violated motor line, and allows lower-priority individual component limits to be violated in order to satisfy the motor limits when no output torque range that satisfies all other constraints can be found along the first violated motor line.

Referring now to FIGS. 5-7, and with continued reference to FIGS. 1-4, there are shown three exemplary graphical representations of individual constraints for the powertrain 100 along with results of the algorithm 200 being executed during the represented operating conditions. The exemplary powertrains 100 shown and graphed in FIGS. 5-7 each have two motor/generators 116 and 118, and have at least two locked torque transmitting mechanisms 130-135. However, other configurations of powertrain 100 may have the same, or similar, operating conditions. FIGS. 5-7 will be described in conjunction with the path taken through the schematic flow charts shown in FIG. 2-4, in order to illustrate a few possible applications of the algorithm 200 (and sub-routines 300, 400).

As viewed in FIG. 5, a first graph 500 is shown plotted with respect to the torque of motor/generator 116 (TA) along an axis 502 (the x-axis) and the torque of motor/generator 118 (TB) along an axis 504 (the y-axis). The direction of increasing output torque for the powertrain 100 is shown by an arrow 506. An optimal split line 510 is the primary line.

The individual component limits are shown as pairs of lines or ellipses. The maximum and minimum torque limits for motor/generator 116 (motor A) are represented by lines 512 and 513, respectively. The maximum and minimum torque limits for motor/generator 118 (motor B) are represented by lines 514 and 515, respectively. The maximum and minimum battery power limits (PBAT_MIN and PBAT_MAX) for battery 120 are shown as ellipses 516 and 517, respectively.

As shown in FIG. 5, the powertrain 100 is operating with three locked clutches, which may be any three of the torque transmitting mechanisms 130-135. The minimum and maximum torque limits for a first locked clutch (TCL1_MIN and TCL1_MAX) are shown as lines 520 and 521, respectively. The minimum and maximum torque limits for a second locked clutch (TCL2_MIN and TCL2_MAX) are shown as lines 522 and 523, respectively. The minimum and maximum torque limits for a third locked clutch (TCL3_MIN and TCL3_MAX) are shown as lines 524 and 525, respectively. In order to satisfy the torque limits for the third locked clutch, the output torque constraints for the powertrain 100 must be chosen such that the torque of motor/generators 116, 118 operate at a point which lies between the lines 524 and 525.

The minimum output torque (TO_MIN) is shown as a line 530 and the maximum output torque (TO_MAX) is shown as a line 531, both of which were found using the algorithm 200, as explained herein. With the exception of lines 530 and 531, the remaining lines shown on graph 500 may be taken as givens and provide inputs for execution of the algorithm 200.

In order to find TO_MIN, the minimum output torque for the powertrain 100 under these conditions, the algorithm 200 begins at step 210. The algorithm 200 then determines that the intersection of PBAT_MIN (ellipse 516) and the primary line (optimal split line 510), shown as an optimal intersection 534, does not satisfy all individual component limits.

Step 214 determines that a clutch limit is violated. In this case, the minimum torque limit for the first locked clutch, TCL1_MIN shown on line 520, is not satisfied at the optimal intersection 534. Therefore, TCL1_MIN or line 520 is the first violated clutch line, and becomes the secondary line. The algorithm then proceeds to step 216 and determines TCL1_MIN is not parallel to lines of constant output toque. The lines of constant output torque are perpendicular to the direction of increasing output torque shown by arrow 506. In this case, lines of constant output torque are horizontal lines, as viewed in FIG. 5.

The algorithm 200 then moves to step 222 and executes the violated clutch limits block along the first violated clutch line (TCL1_MIN). Sub-routine 300 determines that both motor limits are achievable on TCL1_MIN at step 310. Because the motor limits have the highest priority in algorithm 200, these limits are shown graphically as a box, but actually extend beyond (that is, lines 514 and 515 continue horizontally, and lines 512 and 513 actually continue vertically, just as lines 522 and 523 continue vertically, for example). In order to satisfy both motor limits, the first violated clutch line must pass through the box created by the TA and TB limits.

Next, step 312 determines that the intersection of PBAT_MIN and TCL1_MIN would satisfy all remaining individual components limits. Visually, it can be recognized that the intersection of PBAT_MIN and TCL1_MIN is between all of the remaining pairs of limiting lines: 512 and 513 (TA_MIN and TA_MAX); 514 and 515 (TB_MIN and TB_MAX); 522 and 523 (TCL2_MIN and TCL2_MAX); and 524 and 525 (TCL3_MIN and TCL3_MAX).

The sub-routine 300 has verified that all limits are achievable along this line, therefore a clear solution exists along the secondary line, and the algorithm 200 does not need to look for a tertiary line. The sub-routine 300 has determined that the powertrain 100 is battery power limited under these conditions, and proceeds to step 316 to arbitrate along the first violated clutch line to find a solution.

Arbitration along the first violated clutch line (TCL1_MIN, line 520) is shown graphically on an arbitration line 540. The output torque points shown on the arbitration line 520 are the value of output torque due to each of the intersecting points of the individual component limits (i.e. line is parameterized in terms of output torque). The arbitration line is a projection of the intersections due to individual output torque limits with the reference line (TCL1_MIN, line 520, a secondary line) onto a single line showing only the relative output torque values.

The text labels next to each intersection point may be read as the individual output torque limits that arise from the individual component limits along the reference line. For example, as viewed in FIG. 5, the output torque point where TCL1_MIN, line 520 intersects TCL2_MAX, line 523 is easily viewed as directly horizontal (i.e. has equal output torque) to the output torque point labeled TO_TCL2_MAX on the arbitration line 540.

Note that TB_MAX and TB_MIN (lines 515 and 514) are not shown intersecting TCL1_MIN, line 520, because the TA and TB limits have been shown as a box. However, extending the TB limit lines would result in an intersection with TCL1_MIN.

As shown on the arbitration line 540, the maximum of all the linear minimum output torque values is TO_TA_MIN. Therefore, TO_TA_MIN is equal to TO_MIN_LINEAR. Similarly, the minimum of all the linear maximum output torque values is TO_TA_MAX. Therefore, TO_TA_MAX is equal to TO_MAX_LINEAR. Note that the linear maximum and minimum do not always come from the same hardware component, although that was the result in this example.

The sub-routine 300 then applies the arbitration formula from step 316 to the arbitration line 540 to find the minimum output torque for the powertrain 100. TO_MIN=maximum (TO_MIN_LINEAR, minimum [TO_MAX_LINEAR, TO@PBAT_MIN]). Substituting the linear maximum and minimum, the formula becomes: TO_MIN=maximum (TO_TA_MIN, minimum [TO_TA_MAX, TO@PBAT_MIN]). The result is that TO_MIN=TO@PBAT_MIN.

Note, that the arbitration can be solved visually along arbitration line 540. The minimum of TO_TA_MAX and TO@PBAT_MIN is TO@PBAT_MIN; and the maximum of TO_TA_MIN, and TO@PBAT_MIN is again TO@PBAT_MIN. Therefore the minimum output torque constraint for the powertrain 100 under the operating conditions shown on graph 500 is set to the output torque at the intersection of the TCL1_MIN (line 520) and the minimum battery power limit (ellipse 516), and is shown graphically as line 530.

Note that the minimum output torque constraint could be pushed even lower, to the intersection of the minimum battery power limit (ellipse 516) and TCL1_MAX (line 521) without violating any other limits. However, that would result in moving further from the optimal split line, without gaining any further hardware satisfaction. The algorithm 200 is configured not to deviate, or not to deviate further, from the optimal split solely in order to achieve lower output power in a less-efficient manner.

The graph 500 will now be described in relation to finding TO_MAX. In order to find TO_MAX, the maximum output torque for the powertrain 100 under these conditions, the algorithm 200 begins at step 210 and follows the same path as described above in relation to finding TO_MIN. The algorithm 200 then determines that the intersection of PBAT_MAX (ellipse 517) and the primary line (optimal split line 510), shown as an optimal intersection 535, does not satisfy all individual component limits.

The algorithm 200 takes the following path to find TO_MAX, which is the same as above for TO_MIN: step 210; step 214; step 216; step 222; step 310; step 312; step 314; and step 316. At step 316, the sub-routine 300 arbitrates along the same secondary reference line, the first violated clutch line (TCL1_MIN, shown as line 520). The result of arbitration along TCL1_MIN, line 520 is nearly identical to that described above while finding TO_MIN, and is also shown on arbitration line 540.

The formula used is now: TO_MAX=maximum (TO_MIN_LINEAR, minimum [TO_MAX_LINEAR, TO@PBAT_MAX]). Substituting the linear maximum and minimum, the formula becomes: TO_MAX=maximum (TO_TA_MIN, minimum [TO_TA_MAX, TO@PBAT_MAX]). The result is that TO_MAX=TO@PBAT_MAX; and is shown as line 531.

The values of TO_MIN and TO_MAX determined by the algorithm 200 are both slightly below the optimal intersections 534, 535. However, both TO_MIN and TO_MAX were found as clear solutions, and no individual component limits are violated by these output torque constraints. Operating at the optimal intersections 534 or 535 would have violated the TCL1 limits. The controller 140 will set the minimum and maximum output torque constraints to these values determined by the algorithm 200. Furthermore, the controller 140 will command that the motor/generators 116 and 118 be operated in a range which does not exceed the maximum and minimum output torque constraints.

As viewed in FIG. 6, a second graph 600 is shown plotted with respect to the torque of motor/generator 116 (TA) along an axis 602 (the x-axis) and the torque of motor/generator 118 (TB) along an axis 604 (the y-axis). The direction of increasing output torque for the powertrain 100 is shown by an arrow 606. An optimal split line 610 is the primary line.

The individual component limits are again shown as pairs of lines or ellipses. The maximum and minimum torque limits for motor/generator 116 (motor A) are represented by lines 612 and 613, respectively. The maximum and minimum torque limits for motor/generator 118 (motor B) are represented by lines 614 and 615, respectively. The maximum and minimum battery power limits (PBAT_MIN and PBAT_MAX) for battery 120 are shown as ellipses 616 and 617, respectively.

As shown in FIG. 6, the powertrain 100 may be operating with only two locked clutches, which may be any two of the torque transmitting mechanisms 130-135. The minimum and maximum torque limits for a first locked clutch (TCL1_MIN and TCL1_MAX) are shown as lines 620 and 621, respectively. The minimum and maximum torque limits for a second locked clutch (TCL2_MIN and TCL2_MAX) are shown as lines 622 and 623, respectively. The graph 600 shows only a portion of the individual component limits, so there may be a third locked clutch (TCL3) which has limits too wide to be shown in the view of graph 600. However, because the limits of TCL3 are wide—and easily satisfied—TCL3 would not factor into calculation of TO_MAX and TO_MIN.

The operating conditions shown on graph 600 are different from those shown on graph 500. Therefore, the algorithm 200 takes a different path to find TO_MAX and TO_MIN. FIG. 6 and graph 600 will be fully described only in relation to finding TO_MAX, but the algorithm 200 may be used to find TO_MIN.

As applied to graph 600, the algorithm moves from step 210 to step 214 because the optimal intersection of PBAT_MAX and the optimal split line 610 (the primary line) does not satisfy all individual component limits. The limits for the second locked clutch, shown on lines 622 and 623, are not satisfied by the optimal intersection. Step 214 recognizes that TCL2_MIN, line 622, is the first violated clutch limit and becomes as the secondary line. TCL2_MIN, line 622 is not parallel to lines of constant output torque, so step 216 directs the algorithm 200 to step 222 to execute the violated clutch limits block along TCL2_MIN, the first violated clutch line.

Sub-routine 300 determines that both motor limits are not achievable on TCL2_MIN at step 310. The limits for motor/generators 116, 118 are the highest priority limits. In order to satisfy both motor limits, the first violated clutch line must pass through the box created by the TA and TB limits (lines 612, 613 and 614, 615). In this case, the minimum torque limit for motor/generator 116, TA_MIN, line 612 is not satisfied at any point along TCL2_MIN, line 622. Because the motor limits are not achievable along the secondary line (the first violated clutch line), the sub-routine 300 will advance to step 350 and to find a tertiary line which can satisfy the high-priority motor limits.

Step 350 will determine that neither the first violated clutch line (TCL2_MIN) nor the violated motor line (TA_MIN) is parallel to lines of constant output torque and will proceed to step 356. Because TCL2_MIN and TA_MIN are parallel to each other, the sub-routine proceeds to step 358 and switches to the violated, parallel motor line. TA_MIN, therefore, becomes the tertiary line, and the sub-routine will arbitrate along TA_MIN to find a final solution. Because TCL2_MIN and TA_MIN are parallel, the final solution will not be a clear solution and will have to exclude (at least) TCL2_MIN.

Step 360 arbitrates along TA_MIN, the results of which are shown on arbitration line 640. The value of output torque for each individual component limit at its intersection with TA_MIN is shown on the arbitration line 640.

Note that TCL1_MAX, line 621 also intersects TA_MIN, but does so below the connected view of arbitration line 640 shown in FIG. 6. This value TO_TCL1_MIN is shown further down the arbitration line 640. Note that because the intersection of TCL1_MAX with TA_MIN results in a lower output torque value than the intersection of TB_MIN with TA_MIN, the arbitration line 640 would still show all relevant values with TO_TCL1_MIN. Note also that TO_TCL1_MIN comes from the intersection of TCL1_MAX, but is still the minimum output torque level.

At step 360, arbitration along TA_MIN uses the following formula: TO_MAX=maximum (TO_MIN_LINEAR, minimum [TO_MAX_LINEAR, TO@PBAT_MAX]). The highest minimum value along arbitration line 640 gives TO_MIN_LINEAR=TO_TB_MIN; and the lowest maximum value along arbitration line 640 gives TO_MAX_LINEAR=TO_TB_MAX.

Substituting those values into the arbitration formula, TO_MAX=maximum (TO_TB_MIN, minimum [TO_TB_MAX, TO@PBAT_MAX]). The result is that TO_MAX=TO@PBAT_MAX, which is shown on line 631.

In order to find TO_MIN, the algorithm follows the exact same path as it followed for TO_MAX, and again ends up arbitrating for TO_MIN along TA_MIN. Therefore the arbitration line 640, and intersecting values, shown in FIG. 6 are the same for both maximum and minimum output torque. The result of arbitration for minimum output torque is that TO_MIN=TO@PBAT_MIN, which is shown as line 630. Note that not all operating conditions will result in the algorithm 200 following the same, or even similar, path for both TO_MAX and TO_MIN.

As viewed in FIG. 7, a third graph 700 is shown plotted with respect to the torque of motor/generator 116 (TA) along an axis 702 (the x-axis) and the torque of motor/generator 118 (TB) along an axis 704 (the y-axis). The direction of increasing output torque for the powertrain 100 is shown by an arrow 706. An optimal split line 710 is the primary line.

The individual component limits are again shown as pairs of lines or ellipses. The maximum and minimum torque limits for motor/generator 116 (motor A) are represented by lines 712 and 713, respectively. The maximum and minimum torque limits for motor/generator 118 (motor B) are represented by lines 714 and 715, respectively. The maximum battery power limit (PBAT_MAX) for battery 120 is shown as ellipse 717.

The minimum battery power limit (PBAT_MIN) for the operating conditions of graph 700 is not attainable (i.e. there is no PBAT_MIN ellipse). In cases where the minimum battery power limit (normally shown by the PBAT_MIN ellipse) is not attainable, the algorithm may utilize the lowest value of battery power along the reference line, which is the furthest interior point from the PBAT_MAX ellipse along the reference line.

The operating conditions shown on graph 700 are different from those shown on graphs 500 and 600. Therefore, the algorithm 200 takes a different path to find TO_MAX.

As shown in FIG. 7, the powertrain 100 may be operating with only two locked clutches, which may be any two of the torque transmitting mechanisms 130-135. The minimum and maximum torque limits for a first locked clutch (TCL1_MIN and TCL1_MAX) are shown as lines 720 and 721, respectively. The minimum and maximum torque limits for a second locked clutch (TCL2_MIN and TCL2_MAX) are shown as lines 722 and 723, respectively.

As applied to graph 700, the algorithm moves from step 210 to step 214 because the optimal intersection of PBAT_MAX and the optimal split line 710 (the primary line) does not satisfy all individual component limits. A clutch limit is violated, as the limits for the second locked clutch, shown on lines 722 and 723, are not satisfied by the optimal intersection. Step 214 recognizes that TCL2_MAX, line 723, is the first violated clutch limit, which makes TCL2_MAX the secondary line. TCL2_MAX, line 723 is not parallel to lines of constant output torque, so step 216 directs the algorithm 200 to step 222 to execute the violated clutch limits block along TCL2_MAX, the first violated clutch line.

Sub-routine 300 determines that both motor limits are achievable on TCL2_MAX at step 310. Next, step 312 determines that the intersection of PBAT_MAX and TCL2_MAX would not satisfy all remaining individual components limits. Visually, it can be recognized that the intersection of PBAT_MAX and TCL2_MAX is outside the region enclosed by the TCL1 limits, i.e. that region between TCL1_MIN (line 720) and TCL1_MAX (line 721). Therefore, TCL1_MIN, line 720, is the limiting line and acts as a tertiary line.

The sub-routine 300 has determined that the powertrain 100 is either motor or clutch limited under these conditions, and proceeds from step 318 to step 320 to find a better solution along the tertiary line (TCL1_MIN, line 720) than was available along the secondary line (TCL2_MAX, line 723). At step 320, the sub-routine 300 recognizes that TCL1_MIN, line 720 is parallel to lines of constant output torque.

Arbitration along TCL1_MIN, line 720 would result in only one value of output torque. Therefore, step 322 sets the maximum output torque, TO_MAX, to the value of output torque at TCL1_MIN, line 720. Note that, in the graph 700, TO_MAX is not denoted with a separate line because that line would overlap line 720.

The claimed invention has applicability to many configurations and operating modes of the powertrain 100. Algorithm 200 may also be applied to many configurations and operating modes of the powertrain 100. The exemplary conditions shown in FIG. 5-7 all occurred with a multi-mode powertrain 100 operating in fixed-gear states or modes. When operating in a fixed-gear state, the rotational speed of the powertrain 100 output member dictates the rotational speeds of all other rotating (i.e. non-grounded) components within the transmission 112.

When the powertrain 100 is operating in electrically-variable transmission (EVT) modes, the powertrain 100 provides for continuously variable speed ratios by combining features from both series and parallel hybrid powertrain architectures. EVT modes may also be configured for operation of the engine 110 that is mechanically independent from the drive mechanism 114 (including completely disconnecting the engine 110 from the remainder of powertrain 100).

Figure 8:
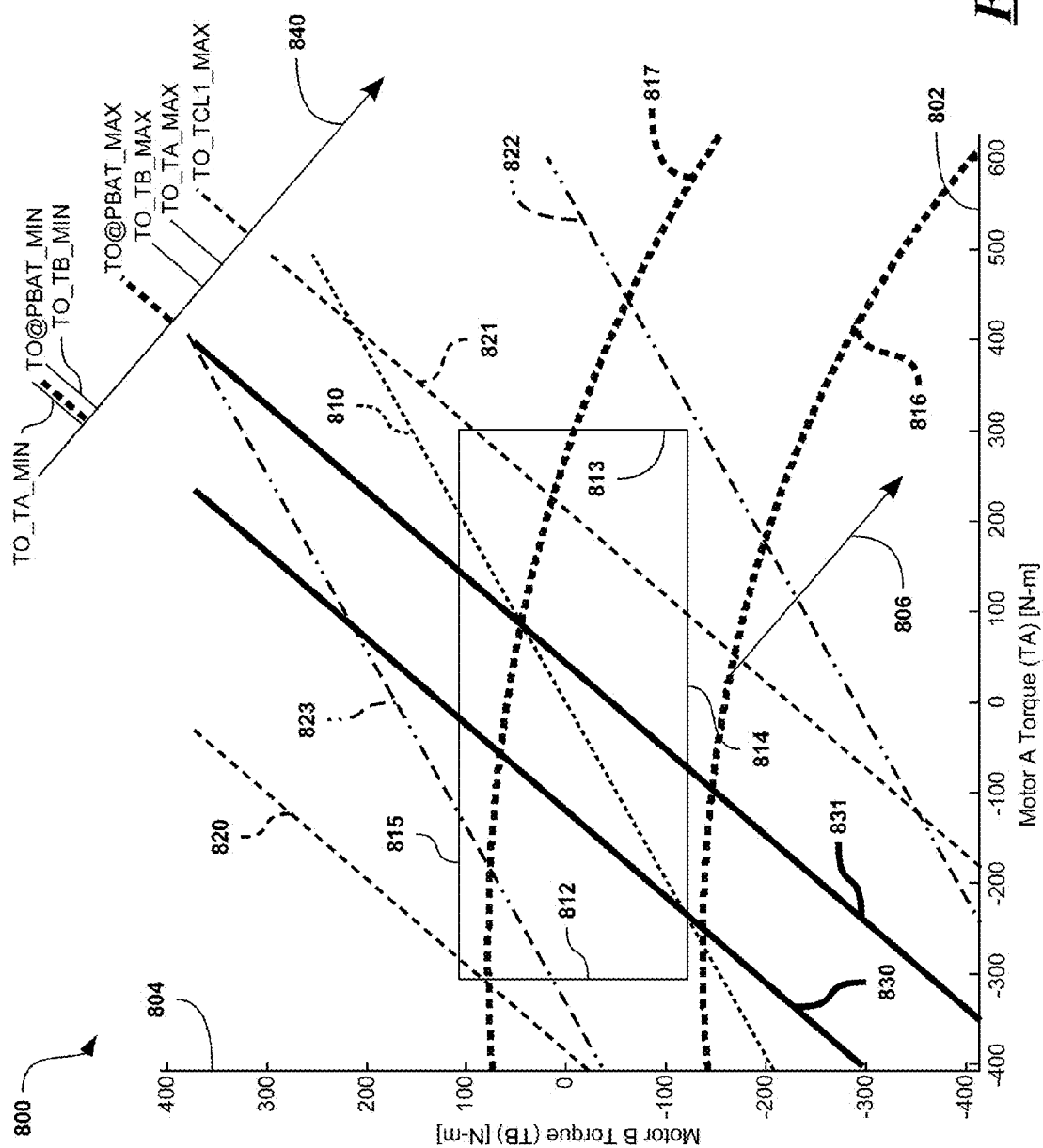
FIG. 8 is an exemplary graphical representation of individual constraints for a powertrain operating in electrically variable transmission mode.

FIG. 8 shows an EVT graph 800 with an illustrative representation of the individual components limits for the powertrain 100 while operating in EVT mode. The graph 800 is shown plotted with respect to the torque of motor/generator 116 (TA) along an axis 802 (the x-axis) and the torque of motor/generator 118 (TB) along an axis 804 (the y-axis). The direction of increasing output torque for the powertrain 100 is shown by an arrow 806.

While operating in EVT modes, when the input torque is known, the individual torque contributions of motor/generators 116 and 118 are linearly related to one another. The graph 800 has an absolute line 810, because the output torque of the powertrain 100 may vary, but TA and TB are fixed based upon the level of output torque. Not only is the absolute ratio line a primary line, it is the only line upon which the solution can be found.

The graph 800 can also be solved using the algorithm 200. In order to do so, the priorities are reordered such that the absolute line 810 is the highest priority and all arbitration occurs along the absolute line 810. Alternatively, the absolute line 810 can be modeled as clutch line which has the maximum and minimum values equal to each other, and which receives ultimate priority in the algorithm, even over the motor torque limits (which receive the highest priority in fixed-gear states). The algorithm 200 would treat the absolute line 810 as both the primary line—upon which the algorithm 200 first searches for a clear solution—and as a tertiary line— upon which the algorithm 200 will always find a final solution, even if a clear solution is not available.

The individual component limits are again shown as pairs of lines or ellipses. The maximum and minimum torque limits for motor/generator 116 (motor A) are represented by lines 812 and 813, respectively. The maximum and minimum torque limits for motor/generator 118 (motor B) are represented by lines 814 and 815, respectively. The maximum and minimum battery power limits (PBAT_MIN and PBAT_MAX) for battery 120 are shown as ellipses 816 and 817, respectively.

In the conditions shown in FIG. 8, the powertrain 100 may be operating in EVT mode with up to two locked clutches, which may be any two of the torque transmitting mechanisms 130-135. The minimum and maximum torque limits for a first locked clutch (TCL1_MIN and TCL1_MAX) are shown as lines 820 and 821, respectively. The minimum and maximum torque limits for a second locked clutch (TCL2_MIN and TCL2_MAX) are shown as lines 822 and 823, respectively.

To solve for TO_MAX and TO_MIN, the controller needs to arbitrate along the primary line, the absolute line 810. An arbitration line 840 visually depicts the values of output torque at the intersections of the individual component limits and the absolute line 810.

Arbitration along the absolute line 810 ignores clutch limits whose lines are parallel to line 810, because those limits are either satisfied if wide enough to encompass the absolute ratio line or cannot ever be satisfied if too narrow to encompass the absolute line 810. Therefore, in the case shown, TCL2_MIN and TCL2_MAX (lines 822 and 823, respectively) are not included in the arbitration.

The result of arbitration for maximum torque is that TO_MAX=TO@PBAT_MAX, which is shown on line 831. The result of arbitration for minimum output torque is that TO_MIN=TO_TB_MIN, which is shown on line 830. This arbitration could have occurred as part of the algorithm 200, or simply could have been initiated as its own algorithm for arbitrating along the absolute line 810.

Parallel hybrid powertrains may utilize only one motor/generator 116 and the engine 110 for combined propulsion and traction. The systems include, for example, belt alternator starter (BAS) powertrains and powertrains having a direct connection (e.g. with a shaft or sleeve shaft) between the engine 110 and motor/generator 116.

FIG. 9 shows a BAS graph 900 with an illustrative representation of the individual components limits for the powertrain 100 while operating in a fixed-gear state (which may be the only operating mode or state for the BAS powertrain 100). The graph 900 is shown plotted with respect to the torque of motor/generator 116 (TA) along an axis 902 (the x-axis) and the torque of motor/generator 118 (TB) along an axis 904 (the y-axis). The direction of increasing output torque for the powertrain 100 is shown by an arrow 906.

The algorithm 200 may be applied to determine the maximum and minimum output torque constrains for the powertrain 100 shown in graph 900. Because there is only one motor/generator 116 included in the powertrain 100, the torque for motor B (TB) is always zero, and the torque limits for motor B (TB_MIN and TB_MAX) are infinitely wide. An optimal split line 910 is again the primary line. However, because there is no motor B, the optimal split line 910 is a horizontal line (as viewed in FIG. 9) at zero TB.

The maximum and minimum torque limits (TA_MIN and TA_MAX) for motor/generator 116 (motor A) are represented by lines 912 and 913, respectively. The maximum and minimum battery power limits (PBAT_IN and PBAT_MAX) for battery 120 are shown as lines 916 and 917, respectively.

Note that in the BAS system, the battery power limits are simply lines instead of ellipses.

In the conditions shown in FIG. 9, the powertrain 100 has two locked clutches, which may be any two of the torque transmitting mechanisms 130-135. For the BAS powertrain 100, the torque transmitting mechanisms 130-135 are likely to be either a belt and pulley system or shaft. However, the algorithm 200 operates in the same way regardless of whether the torque transmitting mechanism limits are due to the friction and hydraulic conditions of a hydraulic clutch or the physical limits of a shaft or belt. For consistency the algorithm 200 for the BAS powertrain 100 may continue to use the same nomenclature, such that first torque transmitting mechanism is still labeled first locked clutch (TCL1).

The minimum and maximum torque limits for a first locked clutch, belt, or shaft (TCL1_MIN and TCL1_MAX) are shown as lines 920 and 921, respectively. The minimum and maximum torque limits for a second locked clutch, belt, or shaft (TCL2_MIN and TCL2_MAX) are shown as lines 922 and 923, respectively. The algorithm 200 may again be utilized to protect up to three locked torque transmitting mechanisms 130-135, so there may be minimum and maximum torque limits for a third locked clutch, belt, or shaft which are not shown.

Application of the algorithm 200 to find TO_MAX for the BAS graph 900 is fairly simple under the operating conditions illustrated. At step 210 the algorithm 200 determines that the intersection of PBAT_MAX and the optimal split line 910 does satisfy all individual component limits. Therefore, at step 212, TO_MAX is set to the value of output torque at the intersection of PBAT_MAX and the optimal split line 910, which is an optimal intersection 935.

Application of the algorithm 200 to find TO_MIN for the BAS graph 900 follows a different path than TO_MAX for the operating conditions illustrated. At step 210 the algorithm 200 determines that the intersection of PBAT_MIN and the optimal split line 910 does not satisfy all individual component limits.

The minimum torque for motor/generator 116 (motor A), TA_MIN on line 912, is not satisfied at an optimal intersection 934. Therefore the optimal intersection 934 cannot be used as the operating point for TO_MIN. The algorithm 200 then proceeds to step 214. Because the violated limit is a motor limit, the algorithm proceeds to step 226 to execute the violated motor limits block along TA_MIN, line 912, the first violated motor line.

Sub-routine 400 determines in step 410 that the violated motor limit TA_MIN, line 912, is parallel to lines of constant output torque. The sub-routine 400 then switches to TA_MIN, line 912 at step 412 and proceeds to step 414. The minimum output torque constraint, TO_MIN is then set to the value of output torque at the first violated motor line TA_MIN, line 912. An operating point 936 marks the minimum output torque constraint selected by algorithm 200 (through sub-routine 400), which is slightly greater than the output torque at the optimal intersection 934.

While the best modes and other embodiments for carrying out the claimed invention have been described in detail, those familiar with the art to which this invention relates will recognize various alternative designs and embodiments for practicing the invention within the scope of the appended claims.

The invention claimed is:

1. A method of determining output torque constraints for a powertrain having a plurality of components, including an engine, a first motor, a battery, and a first torque transmitting mechanism, and comprising:

monitoring individual component limits, including a first motor limit, a first torque transmitting mechanism limit, and a battery power limit, wherein each of the individual component limits includes a minimum and a maximum individual limit;

determining whether each of the individual component limits can be satisfied by selecting a first torque value;

setting an output torque constraint by selecting the first torque value if the first torque value satisfies each of the individual component limits;

selecting a second torque value if the first torque value does not satisfy each of the individual component limits, wherein selecting the second torque value includes following priorities of:
  satisfying the first motor limit,
  then, if possible, satisfying the first torque transmitting mechanism limit, and
  then, if possible, satisfying the battery power limit; and
setting the output torque constraint to the second torque value.

2. The method of claim 1, wherein the powertrain further includes a second motor and a second torque transmitting mechanism, wherein the individual component limits further include a second motor limit and a second torque transmitting mechanism limit, and wherein selecting the second torque value includes following priorities of:
  satisfying the first motor limit and the second motor limit,
  then, if possible, satisfying the first torque transmitting mechanism limit and the second torque transmitting mechanism limit, and
  then, if possible, satisfying the battery power limit.

3. A method of determining output torque constraints for a powertrain having a plurality of components, including an engine, a first motor, a battery, and a first torque transmitting mechanism, and comprising:

monitoring individual component limits, including a first motor limit, a first torque transmitting mechanism limit, and a battery power limit, wherein each of the individual component limits includes a minimum and a maximum individual limit;

arbitrating along a primary line to find a first clear solution, wherein the first clear solution occurs at an output torque constraint that satisfies all of the individual component limits;

if the first clear solution cannot be found, such that a first unsatisfied limit of the individual component limits is not satisfied along the primary line, establishing the first unsatisfied limit as a secondary line;

arbitrating along the secondary line to find a second clear solution;

if the second clear solution cannot be found, such that a second unsatisfied limit of the individual component limits is not satisfied along the secondary line, establishing the second unsatisfied limit as a tertiary line;

arbitrating along the tertiary line to find a third clear solution;

if the third clear solution cannot be found along the tertiary line, finding a final solution by allowing exclusion of a third unsatisfied limit of the individual component limits, wherein the final solution is the nearest solution to the third unsatisfied limit that satisfies the highest number of the remaining individual component limits; and setting the output torque constraint for the powertrain to the last one of the first clear solution, the second clear solution, the third clear solution, and the final solution, consecutively.

4. The method of claim 3, further comprising choosing the third unsatisfied limit by:
- always satisfying the first motor limit;
- allowing exclusion of the first torque transmitting mechanism limit, if exclusion of first torque transmitting mechanism limit will satisfy the first motor limit; and
- allowing exclusion of the battery power limit, if exclusion of battery power limit will satisfy one of: the first motor limit, and both the first motor limit and the first torque transmitting limit.

5. The method of claim 4, wherein the powertrain further includes a second motor and a second torque transmitting mechanism, wherein the individual component limits further include a second motor limit and a second torque transmitting mechanism limit, and wherein the third unsatisfied limit is further chosen by:
- always satisfying both the first and second motor limits;
- allowing exclusion of the second torque transmitting mechanism limit, if exclusion of second torque transmitting mechanism limit will satisfy both the first and second motor limits; and
- allowing exclusion of the battery power limit; if exclusion of battery power limit will satisfy one of:
  - both the first and second motor limits, and
  - both the first and second motor limits and one of the first and second torque transmitting mechanisms.

6. The method of claim 5, wherein the primary line is an optimal split ratio for operation of the first motor and the second motor.

7. The method of claim 6, wherein the secondary line is one of the first, second, or third torque transmitting limits.

8. The method of claim 7, wherein the first and second motor limits are always treated as tertiary lines, such that arbitration along the first and second motor limits may include allowing exclusion of the third unsatisfied limit.

9. The method of claim 8, wherein arbitrating along one of the primary, secondary, and tertiary lines includes:
- finding a first point at the maximum of all minimum individual output torque limits;
- finding a second point at the minimum of all maximum individual output torque limits;
- finding a third point at the intersection of the arbitrating line and the battery power limit; and
- selecting a fourth point equal to the lesser output torque value of the second point and third point, and then selecting the greater output torque value of the fourth point and the first point.

10. The method of claim 9, wherein the powertrain further includes a third torque transmitting mechanism, wherein the individual component limits further include a third torque transmitting mechanism limit, and wherein the third unsatisfied limit is further chosen by:
- always satisfying both the first and second motor limits;
- allowing exclusion of the third torque transmitting mechanism limit, if exclusion of third torque transmitting mechanism limit will satisfy both the first and second motor limits; and
- allowing exclusion of the battery power limit; if exclusion of battery power limit will satisfy one of:
  - both the first and second motor limits, and
  - both the first and second motor limits and at least two of the first, second and third torque transmitting mechanisms.

11. A method of determining output torque constraints for a powertrain having a plurality of components, including an engine, a first motor, a battery, and a first torque transmitting mechanism, and comprising:
- monitoring individual component limits, including a first motor limit, a first torque transmitting mechanism limit, and a battery power limit, wherein each of the individual component limits includes a minimum and a maximum individual limit;
- arbitrating along a primary line to find a first clear solution, wherein the first clear solution satisfies all individual component limits;
- if the first clear solution cannot be found, such that a first unsatisfied limit is not satisfied along the primary line, finding a final solution by allowing exclusion of the first unsatisfied limit, wherein the final solution is the nearest solution to the first unsatisfied limit that satisfies all remaining individual component limits; and
- setting the output torque constraint for the powertrain to the first clear solution, if found, and setting the output torque constraint for the powertrain to the final solution if the first clear solution was not found.

12. The method of claim 11,
wherein the powertrain is operating in an electrically variable transmission mode, and
wherein the primary line is an absolute limit and setting the output torque constraint always includes selecting a point intersecting the primary line.

13. The method of claim 12, further comprising choosing the first unsatisfied limit by:
- always satisfying the first motor limit;
- allowing exclusion of the first torque transmitting mechanism limit, if exclusion of the first torque transmitting mechanism limit is necessary to satisfy the first motor limit; and
- allowing exclusion of the battery power limit, if exclusion of the battery power limit is necessary to satisfy one of the first motor limit and both the first motor limit and the first torque transmitting limit.

14. The method of claim 13, wherein arbitrating along the primary line includes:
- finding a first output torque point at the maximum of all minimum individual output torque limits intersecting the primary line;
- finding a second output torque point at the minimum of all maximum individual output torque limits intersecting the primary line;
- finding a third output torque point at the intersection of the primary line and the battery power limit; and
- selecting a fourth output torque point equal to the lesser output torque value of the second output torque point and third output torque point, and then selecting the greater output torque value of the fourth output torque point and the first output torque point.

* * * * *